(No Model.)
E. NORTON.
PREPARED SOLDER FOR VENT HOLES.
No. 364,664. Patented June 14, 1887.
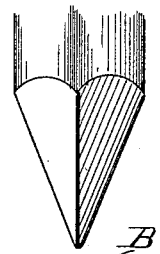
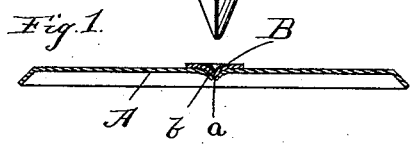
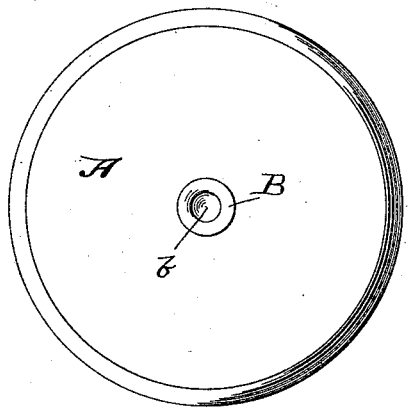
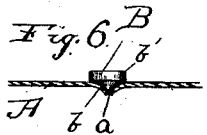  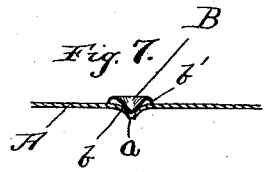
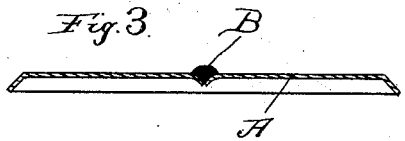
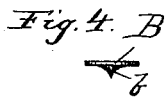
Witnesses:
Lew. E. Curtis.
H. W. Munday.
Inventor:
Edwin Norton
By Munday, Evarts & Adcock
his Attorneys
N. PETERS, Photo-Lithographer, Washington, D. C.

UNITED STATES PATENT OFFICE.

EDWIN NORTON, OF CHICAGO, ILLINOIS, ASSIGNOR TO HIMSELF AND OLIVER W. NORTON, OF SAME PLACE.

PREPARED SOLDER FOR VENT-HOLES.

SPECIFICATION forming part of Letters Patent No. 364,664, dated June 14, 1887.

Application filed January 17, 1887. Serial No. 224,512. (No model.)

*To all whom it may concern:*

Be it known that I, EDWIN NORTON, a citizen of the United States, residing at Chicago, in the county of Cook and State of Illinois, have invented a new and useful Improvement in Prepared Solder for Soldering the Vent-Holes in Can-Caps, of which the following is a specification.

Heretofore in soldering up the vent-holes in can-caps a comparatively large amount of solder has usually been required or wasted, owing to the difficulty of properly centering or fixing or applying the solder to the vent before or at the time the solder is melted.

It is the object of my invention to provide a can-cap-vent-hole solder of such form that it may be easily and quickly centered over the vent-hole, and will retain its place while the soldering-tool or heat is being applied to melt it.

To this end my invention consists in a thin disk of sheet-solder having a central depression or point adapted to enter the vent-hole in the can-cap. This central depression in the small disk of solder may be formed by stamping or pressing, and at the same time the sheet-disk is cut or otherwise made. The central depression or projection on the thin disk of solder renders it easy to apply, and serves also to hold the solder in place while the soldering-tool or heat is applied to melt it.

In the accompanying drawings, which form a part of this specification, and in which similar letters of reference indicate like parts, Figure 1 is a central vertical section of a thin disk of solder embodying my invention, and showing also the can-cap and the end of a soldering-tool. Fig. 2 is a plan view of the same. Fig. 3 is a section of the can-cap after the vent-hole has been soldered. Figs. 4, 5, 6, and 7 are views representing slight modifications.

In the drawings, A represents the can-cap, and B the thin solder-disk for soldering the vent-hole. The solder-disk B is provided with a central projection, $b$, on its under face to fit in the vent-hole $a$ of the can-cap, and thus center the solder-disk in place and hold it there while the soldering is being done. This projection $b$ may best be formed by simply making a central depression in the solder-disk, as indicated in Fig. 1. It may, however, be a projecting point formed upon the under face of the solder-disk, as indicated, for example, in Fig. 5. It is preferable, however, to form the projection $b$ by depressing the central portion of the solder-disk, as in this way the disks are enabled to nest together, and so not be liable to injury or distortion in shipment.

The edges or rim of the solder-disk may be flanged or turned up or down, as indicated in Figs. 6 or 7. The turned flange or rim $b'$ at the edge of the solder-disk gives it an increased thickness at its edge, and facilitates its handling, and also contracts the diameter of the disk and brings the solder nearer to the soldering-iron, so that it will melt quicker and flow more readily into the vent-hole. The cup or flanged form of the disk is the one I prefer, as shown in Figs. 6 or 7—that is to say, the more improved form. The disk is preferably circular in form, corresponding to the hole in the cap of the can. The disk, however, may be of other than a round form.

I claim—

1. A disk of solder for soldering vent-holes, having a projection or point to register with the vent-hole, substantially as specified.

2. A thin sheet-disk of solder having its central portion depressed to form a registering-point to fit in the vent-hole for soldering the same, substantially as specified.

3. A thin disk of solder for soldering vent-holes, having a central projection to register with the vent-hole, and a flanged rim, substantially as specified.

EDWIN NORTON.

Witnesses:
H. M. MUNDAY,
LEW. E. CURTIS.